(12) United States Patent
Ciccone (10) Patent No.: US 7,413,431 B2
(45) Date of Patent: Aug. 19, 2008

(54) INJECTION MOLDING NOZZLE TIP HAVING FINNED INNER INSERT

(75) Inventor: Vince Ciccone, Kleinburg (CA)

(73) Assignee: Injectnotech Inc., Mississauga (CA)

( * ) Notice: Subject to any disclaimer, the term of this patent is extended or adjusted under 35 U.S.C. 154(b) by 247 days.

(21) Appl. No.: 11/476,412

(22) Filed: Jun. 27, 2006

(65) Prior Publication Data

US 2007/0003661 A1 Jan. 4, 2007

Related U.S. Application Data

(60) Provisional application No. 60/694,642, filed on Jun. 27, 2005.

(51) Int. Cl.
*B29C 45/20* (2006.01)
(52) U.S. Cl. .................................. 425/549; 264/328.15
(58) Field of Classification Search .................. 425/549; 264/328.15
See application file for complete search history.

(56) References Cited

U.S. PATENT DOCUMENTS 5,268,184 A * 12/1993 Gellert ........................ 425/190
5,513,976 A * 5/1996 McGrevy ..................... 425/549
6,962,492 B2 * 11/2005 Olaru et al. .................. 425/549

* cited by examiner

*Primary Examiner*—Tim Heitbrink
(74) *Attorney, Agent, or Firm*—Townsend and Townsend and Crew LLP (57) ABSTRACT

A series of injection molding nozzle tips having a novel inner insert. The novel inner insert in accordance with the embodiments of the present invention includes a finned profile having flow channels between the finned sections. The finned profile and its associated flow channels cause the flow of molten plastic in the nozzle to go through a breakup into the flow channels before it is merged at the nozzle flow exit. This breaking up of the molten plastic flow and its merging insures a better mixing of the molten plastic and also reduces stresses within the molded part.

23 Claims, 9 Drawing Sheets

SECTION A-A

SECTION B-B

FIG. 10

SECTION C-C

INJECTION MOLDING NOZZLE TIP HAVING FINNED INNER INSERT

CROSS-REFERENCES TO RELATED APPLICATIONS

The present application claims priority to U.S. Provisional Patent Application No. 60/694,642, filed Jun. 27, 2005, the disclosure of which is incorporated herein by reference in its entirety.

BACKGROUND OF THE INVENTION

The present invention relates to plastic injection molds, and in particular, to nozzles for the hot runner system of such injection molds.

BRIEF SUMMARY OF THE INVENTION

The present invention is directed towards an injection molding nozzle tip having a novel inner insert. The novel inner insert in accordance with the embodiments of the present invention includes a finned profile having flow channels between the finned sections. The finned profile and its associated flow channels cause the flow of molten plastic in the nozzle to go through a breakup into the flow channels before it is merged at the nozzle flow exit. This breaking up of the molten plastic flow and its merging insures a better mixing of the molten plastic and also reduces stresses within the molded part.

Certain embodiments of the inner insert have more than one finned/channel sections, in which case the fins of the first finned section are staggered with respect to the fins of the second section, so as to provide a serpentine-like flow path for the molten plastic as it travels down the length of the inner insert. Furthermore, in certain embodiments having more than one finned/channel sections, the number of fins/flow channels in the first section may be different from the number of fins/channels in the second section.

In certain embodiments, the fins/flow channels are aligned vertically with respect to the length of the nozzle insert, or alternatively, the fins/channels follow helical or other paths that are not parallel with respect to the length of the nozzle insert. For the non-parallel (with respect to the length of the nozzle insert) paths, and for the embodiments having more than one fin/channel sections, the flow channels may be aligned all with the same offset (e.g., counter clockwise/or clockwise) with respect to the length of the nozzle insert, or alternatively, the flow channels may be rotated such that a first set has one offset (e.g., clockwise) and the other set has a different offset (e.g., counter clockwise) with respect to the length of the nozzle insert.

The novel nozzle insert in accordance with the embodiments of the present invention may be used with either a two-piece nozzle tip, having a combination inner insert—outer insert, or a three-piece nozzle tip, having a combination inner insert—outer insert—sealing surrounding piece/ring. Other aspects of the two-piece nozzle tips and three-piece nozzle tips are disclosed in copending patent applications assigned to assignee herein, including: U.S. patent application Ser. No. 10/934,544 filed Sep. 3, 2004; U.S. patent application Ser. No. 11/286,266 having an effective filing date of Nov. 22, 2004, and U.S. patent application Ser. No. 11/319,757 having an effective filing date of Dec. 30, 2004; the disclosures of which are herein incorporated by reference in their entirety for all purpose not inconsistent with the present description.

For a further understanding of the nature and advantages of the invention, reference should be made to the following description taken in conjunction with the accompanying drawings.

DETAILED DESCRIPTION OF THE INVENTION

Figure 1:
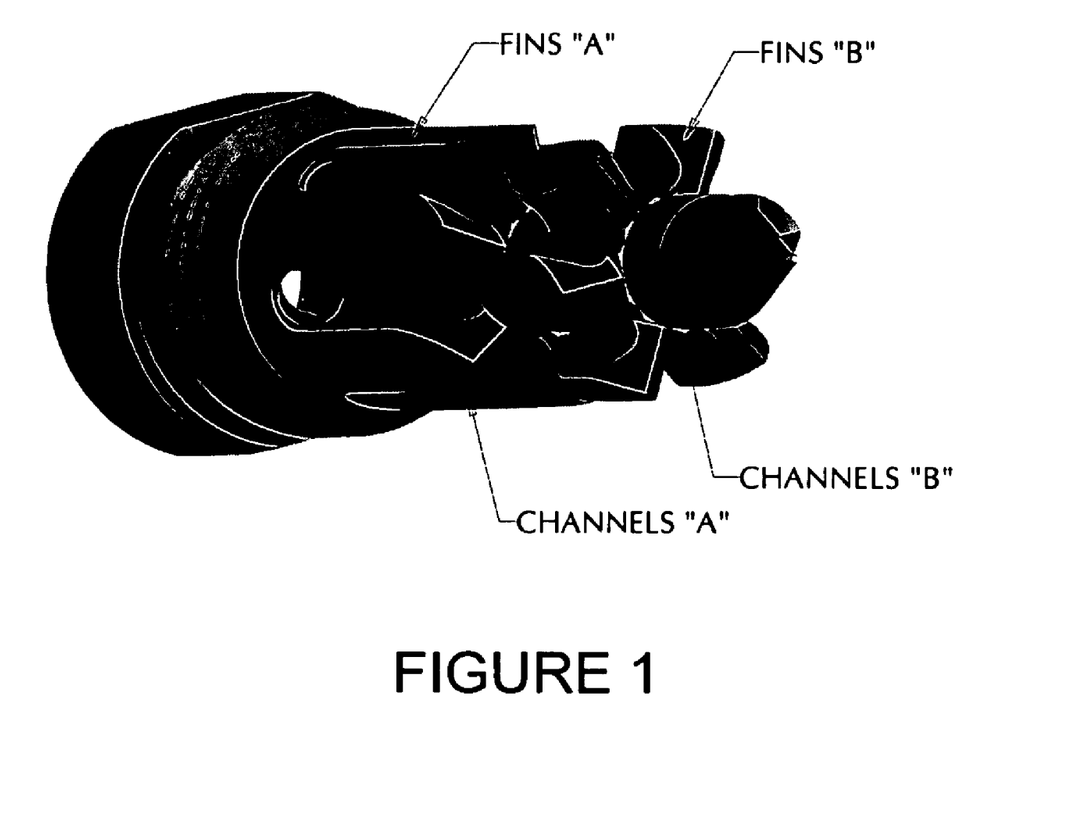
FIG. 1 is an exemplary shaded perspective view of a first embodiment of an injection molding nozzle insert in accordance with the present invention.

FIG. 1 is an exemplary shaded perspective view of a first embodiment of an injection molding nozzle insert in accordance with the present invention. FIG. 1 shows the nozzle insert with two sets of finned sections, namely fins "A" and fins "B." FIG. 1 also shows that flow channels exist (Channels "A") between fins "A" and that flow channels (channels "B") exist between fins "B." It should be noted that while FIG. 1 shows two sets of finned/channeled portions, the embodiments of the present invention are not limited to two sets of finned/channeled portions, and for example, three, four or more, or only one finned/channeled section may be used. Also shown in FIG. 1 is that the inner insert in accordance with the embodiments of the present invention has a cylindrical head on which two flat surfaces are machined for torquing purpose (other shapes suitable for torquing may be used). A threaded portion follows, for threaded engagement in an outer insert. A cylindrical portion is next, for centering in the outer insert. A number of equally spaced channels "A" are formed (e.g., machined) on the cylindrical surface, adjacent the thread. The raised portions formed between channels "A" are designated as fins "A." Fins and channels "A" are followed by an annular well "C" (also shown in FIG. 2). A second set of fins and channels "B" follows, then a reduced cylindrical portion that tapers off into a conical end of tip, where the molten plastic exits from the nozzle and into a mold.

Figure 2:
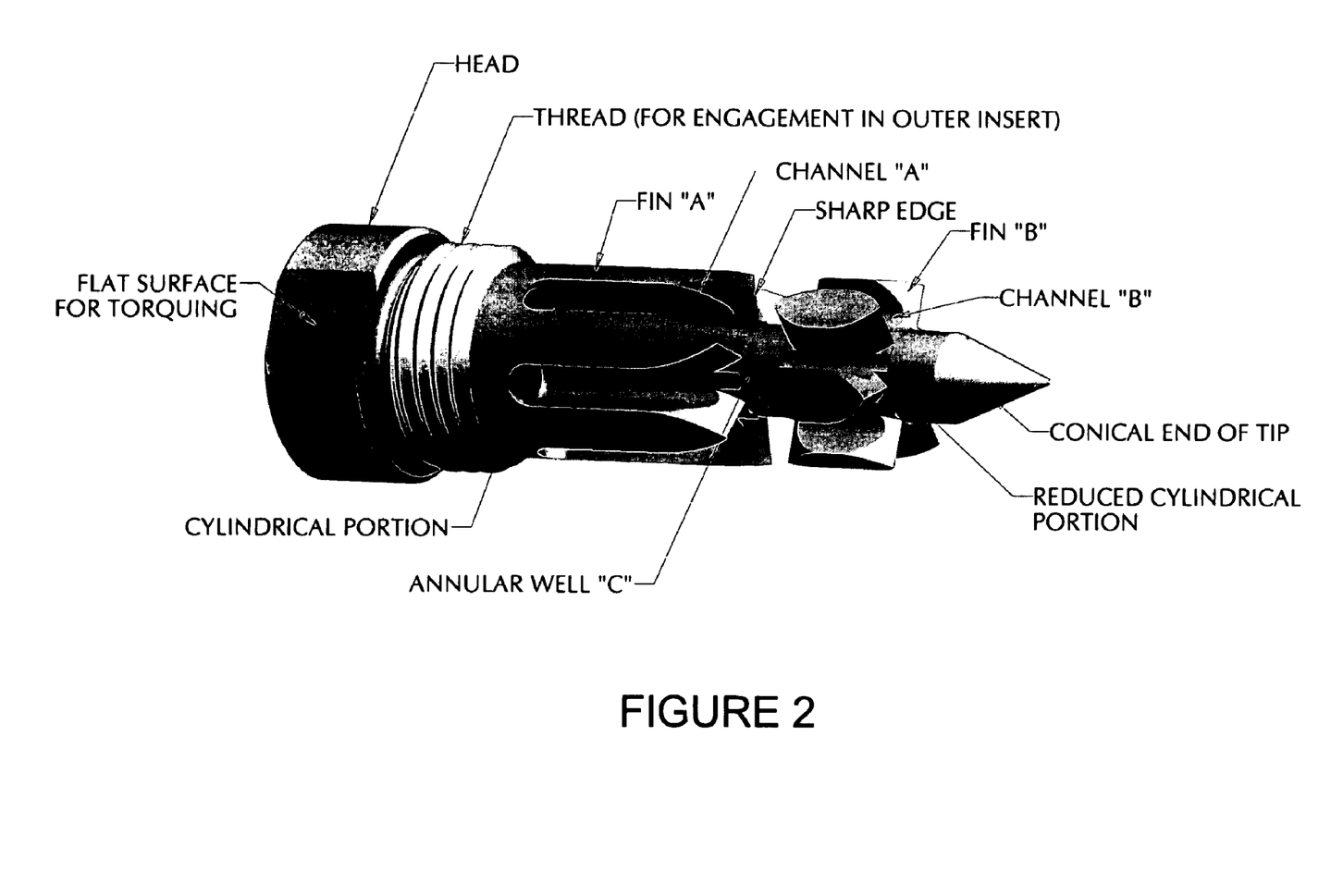
FIG. 2 is another exemplary shaded perspective view of a first embodiment of an injection molding nozzle insert in accordance with the present invention.

FIG. 2 is another exemplary shaded perspective view of a first embodiment of an injection molding nozzle insert in accordance with the present invention. This figure shows that the fins have a sharp edge towards the end of the flow channel which helps provide an expanding flow channel (channel "A") for the molten plastic flow. Furthermore, fins in the second portion also have a sharp or narrowed profile at the inlet to channel "B", near well "C" and also have a narrowed profile at the end near the reduced cylindrical portion near the conical end. This geometry creates flow channels that have entries and exits that provide improved entry and exit conditions for the molten plastic flow. It should be noted that the nozzle insert, in accordance with the-embodiments of the present invention may have non-tapered fin profiles so as to create flow channels having a same flow cross-sections at their entry and exit points.

Figure 3:
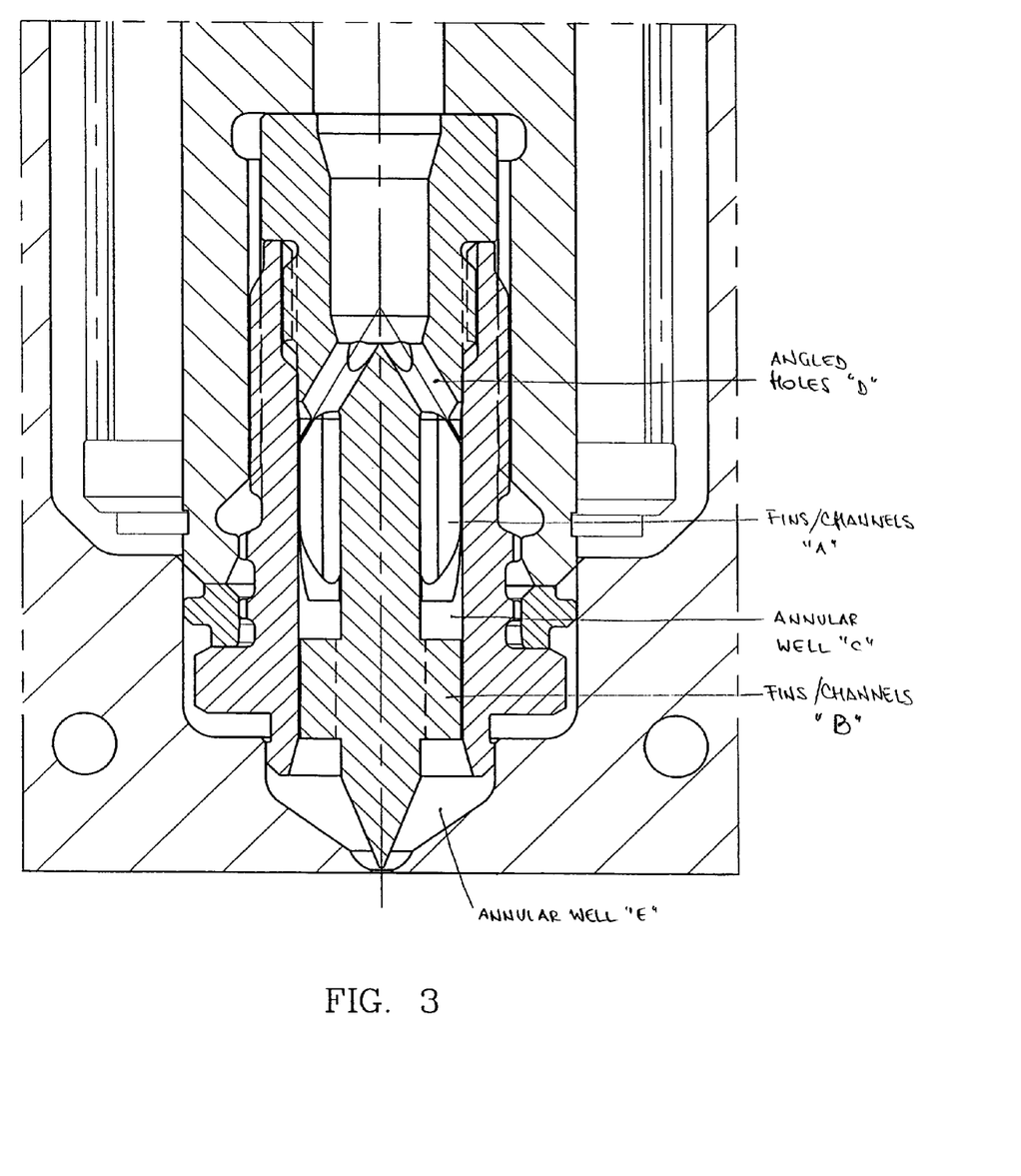
FIG. 3 is an exemplary vertical sectional view of the nozzle insert of FIG. 1 shown assembled with a three-piece nozzle located in an injection molding device.

FIG. 3 is an exemplary vertical sectional view of the nozzle insert of FIG. 1 shown assembled with a three-piece nozzle located in an injection molding device. As shown in FIG. 3, the inner insert has a central hole from which a number of angled holes "D" extend to channels "A" (each channel "A" can be connected to the central hole by one angled hole "D").

Fins "A" and "B" are tapering off to sharp edges toward well "C" and toward annular well "E" at the front of the tip, as shown in FIGS. 1 and 2. The design shown in the figures has 6 fins "A" and 6 fins "B". Fins "B" are not in line with fins "A," but rather in line with the middle of channels "A," such that molten plastic from one channel "A" is diverted into the nearest two channels "B." In other words, the molten plastic of each channel "B" results from a mix of parts of plastic from the two closest channels "A."

In an alternate embodiment, the number fins "A" and "B" are different. For example, an alternate embodiment has 6 fins "A" and 12 fins "B," symmetrically staggered such that each channel "A" feeds two symmetrically placed channels "B." Further designs are envisioned, where the number of fins "B" is larger than that of fins "A" (such as 6 fins "A" and 8 or 10 fins "B;" or 8 fins "A" and 10 or 12 fins "B", etc.). In some of the embodiments contemplated, the fins are equally spaced around the tip axis.

As molten plastic reaches the inner insert, it is diverted into angled holes "D" and directed to channels "A." The flow lines from channels "A" reconnect in annular well "C" (the tapering ends of fins "A" aid plastic flow to well "C"), to separate again in channels "B" (tapering sides of fins "B" help plastic flow into, then exit from channels "B"), then reaching annular well "E" and the gate.

The nozzle insert in accordance with the embodiments of the present invention provides for an improved nozzle and mold performance. For example, tips having one angled hole at the conical end of the tip can suffer from performance shortfalls for applications involving color changes. The inventor herein has discovered that some parts injected using a single-hole tip, because of the color pigmentation, displayed one streak of discoloration (when viewed closely in strong light). Also, because of the angled orientation of the singular hole, the plastic tended to flow preferentially on one side through the gate, which caused core shift on taller parts.

Furthermore, the use of some three-hole diverted tip nozzles (for example, such as those of the assignees herein and disclosed in the copending applications disclosed herein) improved the color change, but some parts still showed so-called "dead" areas, in this case causing three streaks of discoloration along the injected parts. The same was observed with some two-hole tips where two streaks would be visible.

Accordingly, partly to improve color blending, the presently disclosed nozzle tips are developed to have more than three flow lines (in this case 6 channels). Holes "D" and channels "A" separate the molten plastic into six flow lines, then plastic is mixed in annular well "C," separated again in the six flow channels "B" and re-mixed in annular well "E" before it reaches the gate. By diverting and mixing the molten plastic repeatedly, a better blending of the pigment prior to injection is achieved, which also successfully eliminates the streaking problem.

Furthermore, initial experiments using the nozzle insert in accordance with the embodiments of the present invention indicates that stresses within the molded part at the gate area have been reduced. Some parts molded using nozzles without the nozzle insert in accordance with the embodiments of the present invention can suffer from tensions at the gate area, for example, as manifested by cracks at the injection point of the product when subjected to conventional impact tests, whereas similar parts molded using the nozzle inserts in accordance with the embodiments of the present invention did not exhibit such cracks when molded and tested under the same conditions. While not being limited to any theory, the inventor herein speculates that the flow geometry of the present embodiments reduces the tensions within the molded part and provides for additional flow paths for the molten plastic while keeping the structural integrity of the nozzle tip. Known devices tend to increase the flow paths or exit paths for the molten plastic at the expense of the structural integrity of the nozzle tip FIG. 4 is a line drawn perspective view corresponding to the shaded views of FIGS. 1-2.

Figure 4:
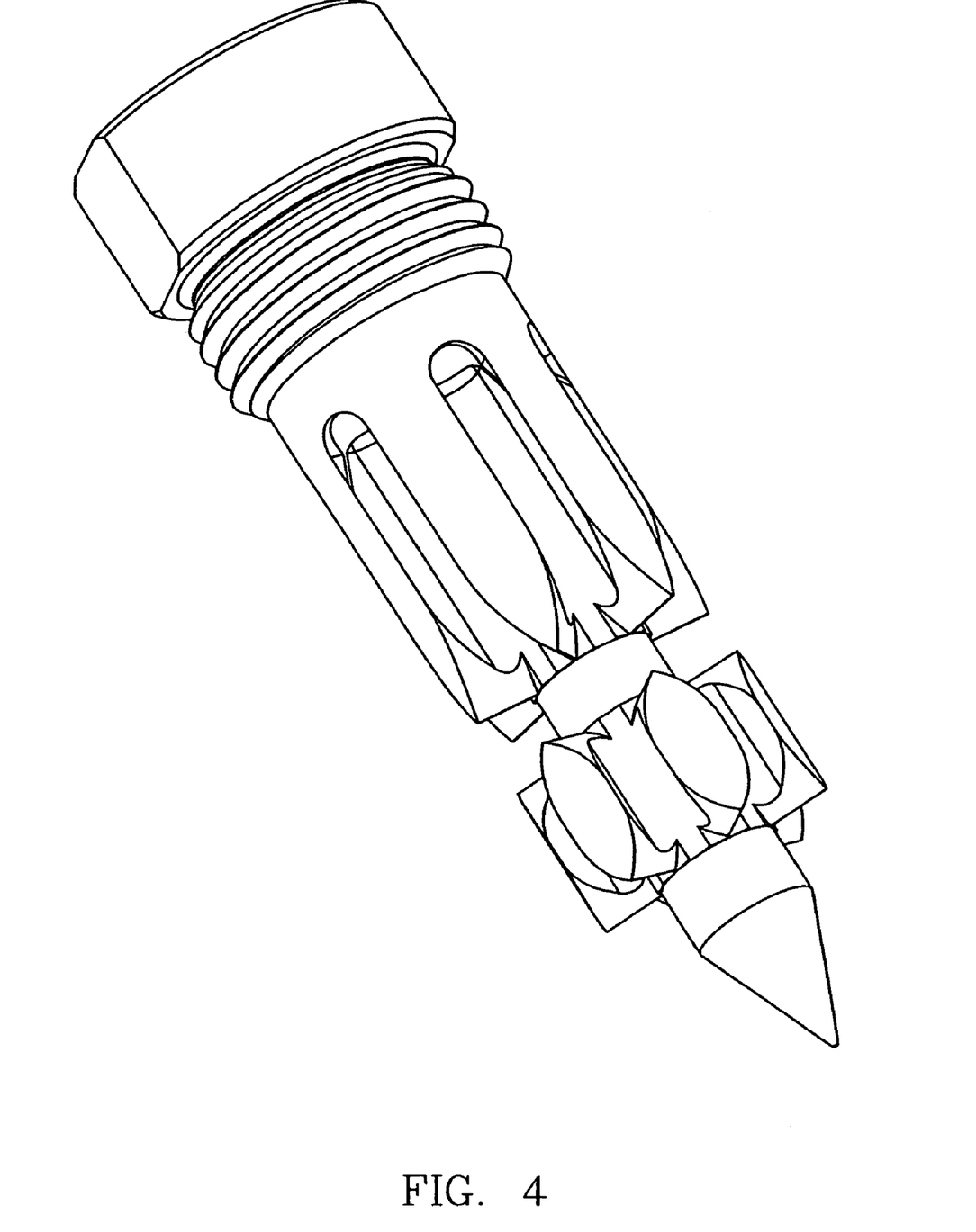
FIG. 4 is a line drawn perspective view corresponding to the shaded views of FIGS. 1-2.
Figure 5:
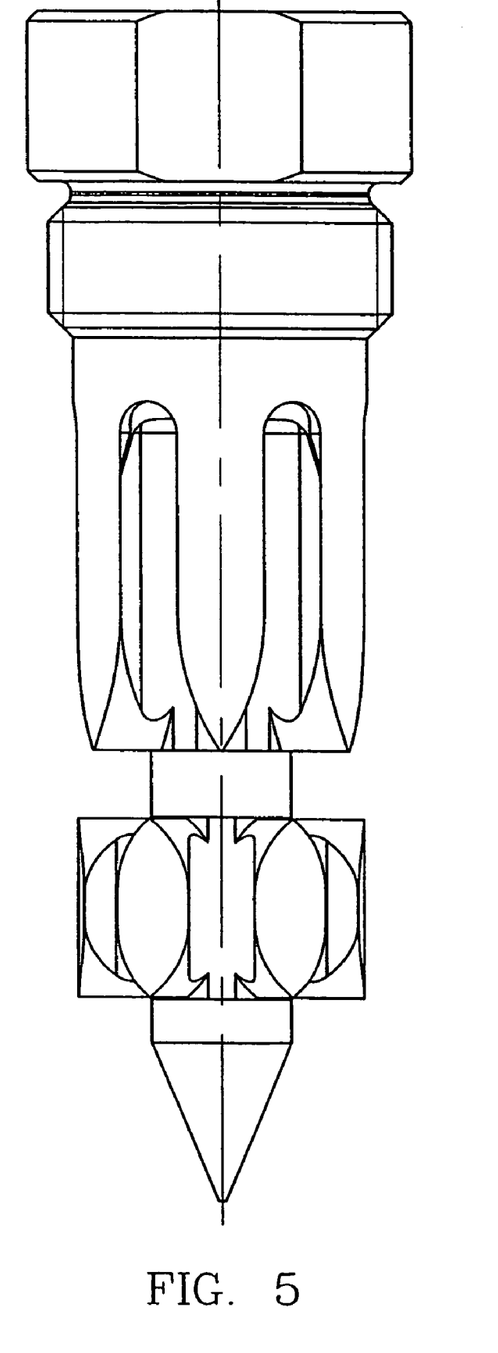
FIG. 5 is a vertical line drawing of the nozzle insert of FIG. 4, shown with the centerline of the insert coincident with the center of an upper finned portion.

FIG. 5 is a vertical line drawing of the nozzle insert of FIG. 4, shown with the centerline of the insert coincident with the center of an upper finned portion. Flow channels in the upper finned portion are staggered with respect to the flow channels in the lower finned portion.

Figure 6:
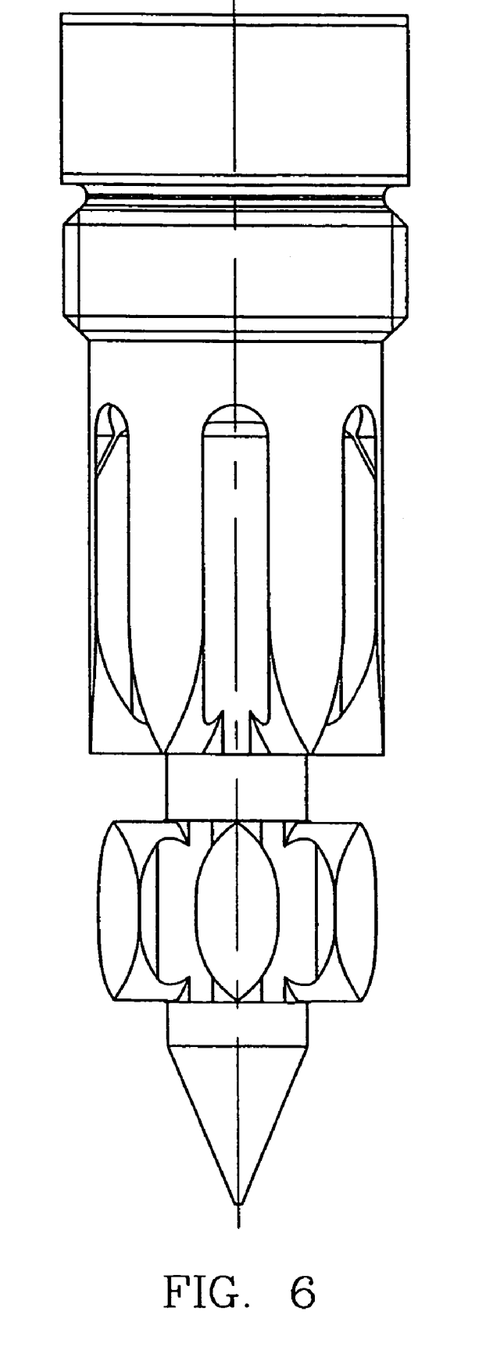
FIG. 6 is another vertical line drawing of the nozzle insert of FIG. 4, shown with the centerline of the insert coincident with the center of an upper channel formed between the upper finned portions.

FIG. 6 is another vertical line drawing of the nozzle insert of FIG. 4, shown with the centerline of the insert coincident with the center of an upper channel formed between the upper finned portions.

Figures 7, 8:
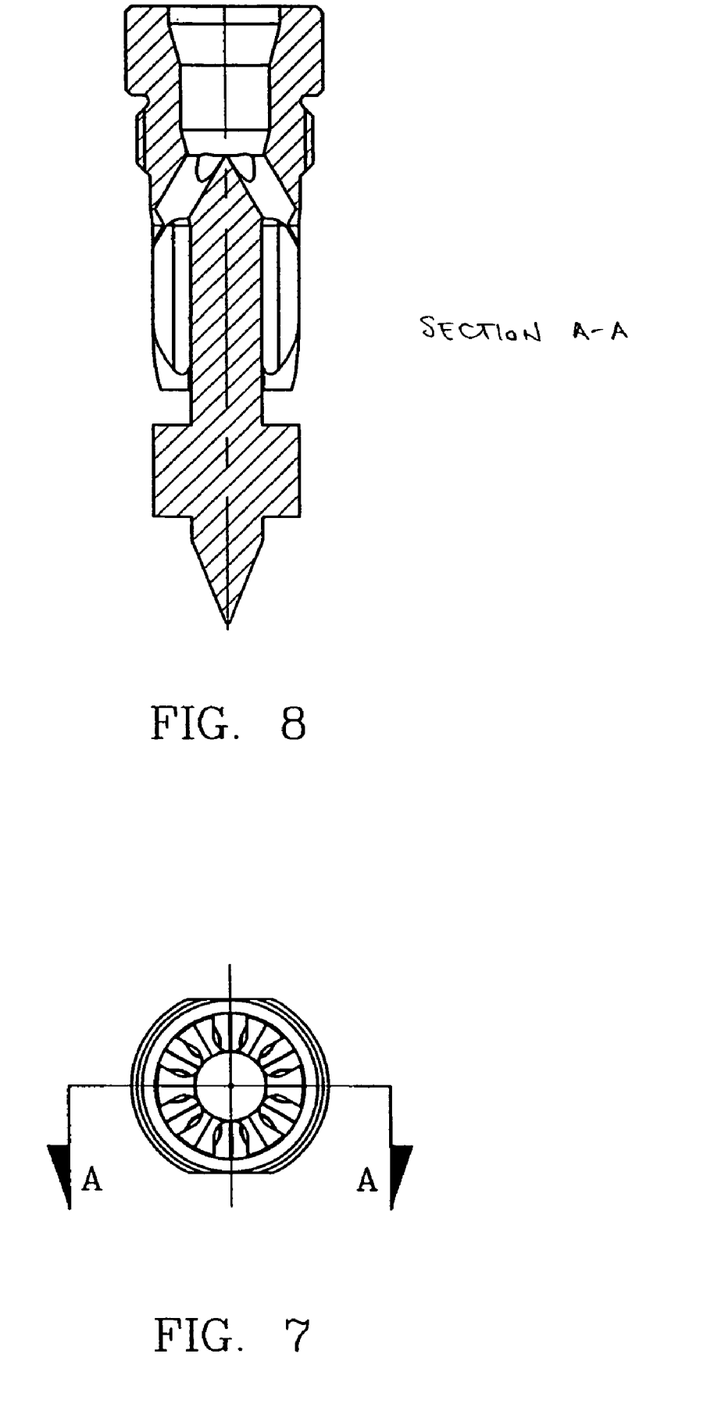
FIG. 7 is a top view corresponding to the nozzle insert of FIGS. 5-6.
FIG. 8 is a vertical section view "A-A" corresponding to the nozzle insert of FIG. 7.

FIG. 7 is a top view corresponding to the nozzle insert of FIGS. 5-6. FIG. 8 is a vertical section view "A-A" corresponding to the nozzle insert of FIG. 7. FIGS. 7-8 show that flow channels in the upper finned portion are staggered with respect to the flow channels in the lower finned portion.

Figure 9:
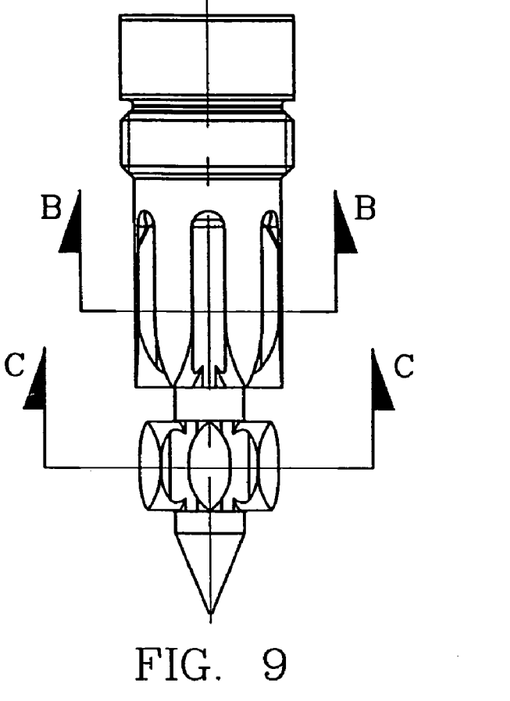
FIG. 9 is another vertical line drawing of the nozzle insert of FIG. 4, shown with the centerline of the insert coincident with the center of an upper channel formed between the upper finned portions.
Figure 10:
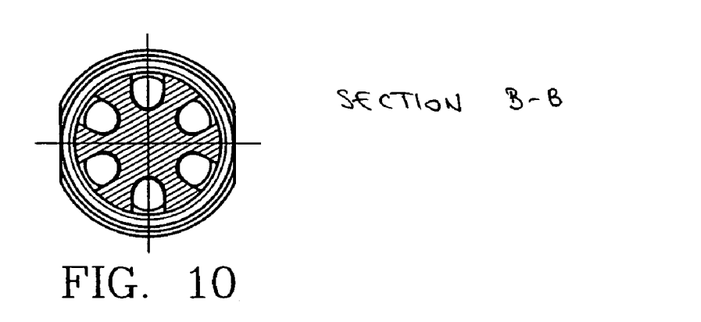
FIG. 10 is a horizontal sectional view "B-B" corresponding to the nozzle insert of FIG. 9.
Figure 11:
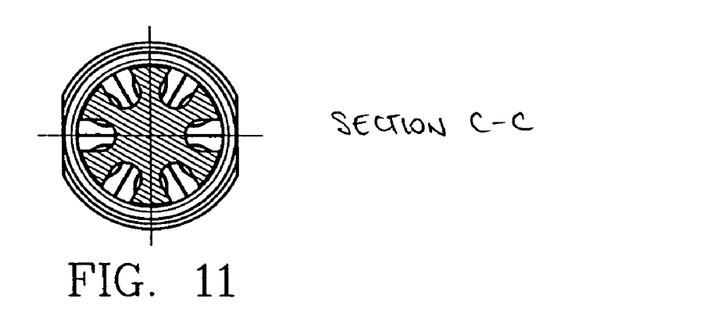
FIG. 11 is a horizontal sectional view "C-C" corresponding to the nozzle insert of FIG. 9.

FIG. 9 is another vertical line drawing of the nozzle insert of FIG. 4, shown with the centerline of the insert coincident with the center of an upper channel formed between the upper finned portions. FIG. 10 is a horizontal sectional view "B-B" corresponding to the nozzle insert of FIG. 9. FIG. 11 is a horizontal sectional view "C-C" corresponding to the nozzle insert of FIG. 9. FIGS. 9-11 shows that flow channels in the upper finned portion are staggered with respect to the flow channels in the lower finned portion. Furthermore, FIG. 10 shows that the inner insert has a number of angled holes "D" which enable the molten plastic flow to flow into channels "A and that each channel "A" is connected to one angled hole "D").

Figure 12:
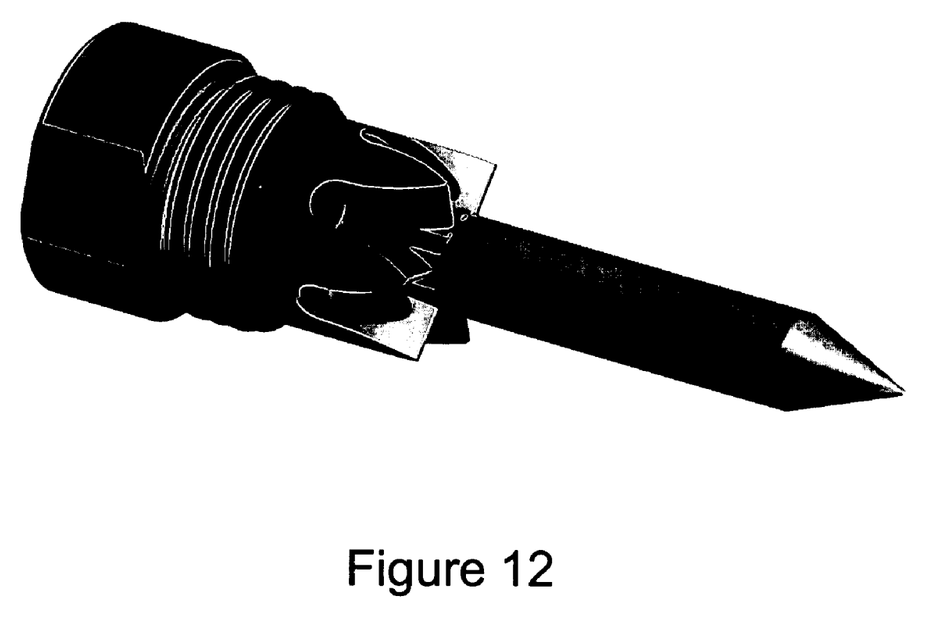
FIG. 12 is an exemplary shaded perspective view of a second embodiment of an injection molding nozzle insert in accordance with the present invention, showing one set of finned portions with channels between the finned portions.

FIG. 12 is an exemplary shaded perspective view of a second embodiment of an injection molding nozzle insert in accordance with the present invention, showing one set of finned portions with channels between the finned portions. Similar to the embodiment shown in FIG. 1, the inner insert in accordance with the embodiments of the present invention has a cylindrical head on which two flat surfaces are machined for torquing purpose (other shapes suitable for torquing may be used). A threaded portion follows, for threaded engagement in an outer insert. A cylindrical portion is next, for centering in the outer insert. A number of equally spaced channels are machined on the cylindrical surface, adjacent to the thread. The raised portions formed between channels are referred to herein as fins. Fins and channels are followed by a reduced cylindrical portion that tapers off into a conical end of tip, where the molten plastic exits from the nozzle and into a mold.

Figure 13:
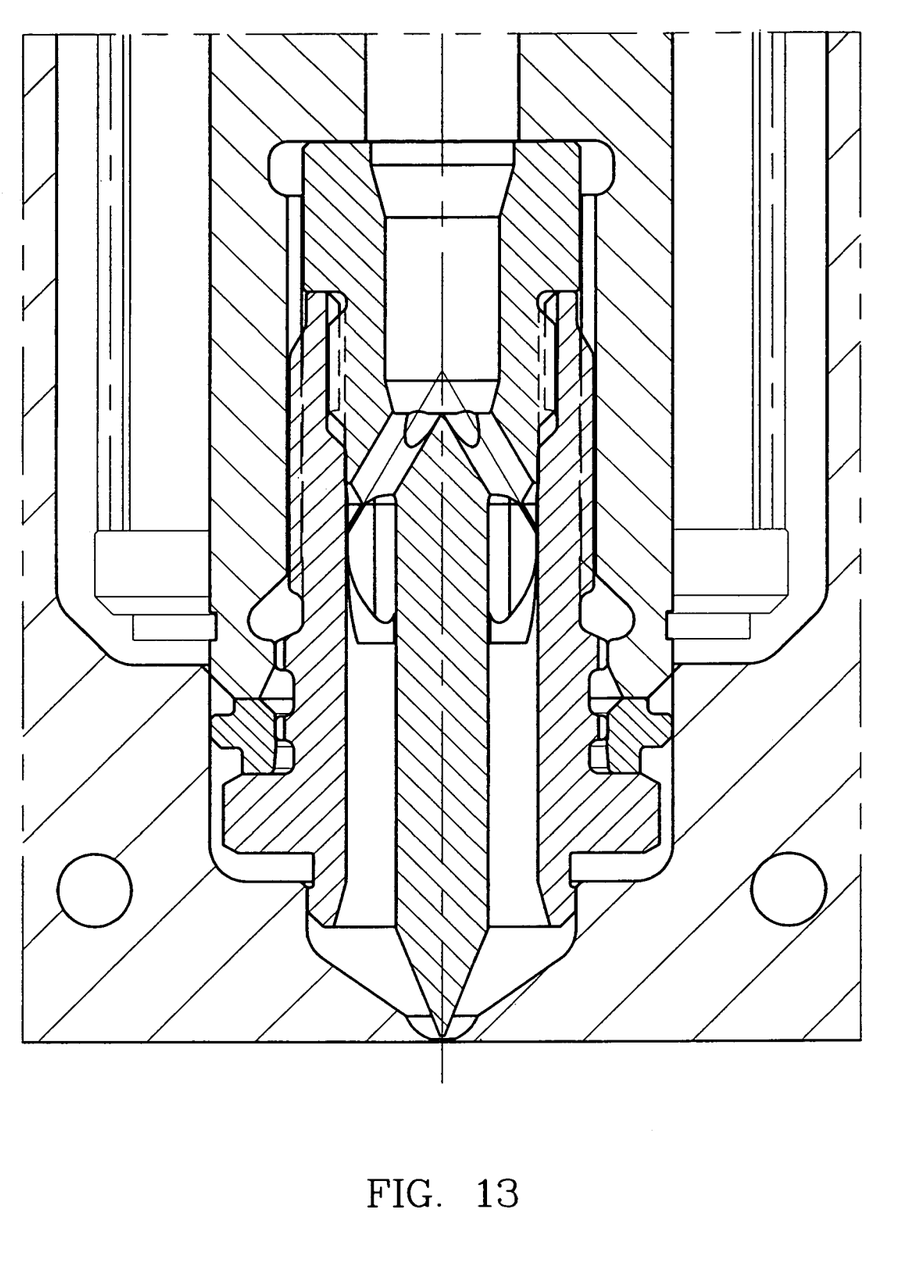
FIG. 13 is an exemplary vertical sectional view of the nozzle insert of FIG. 12 shown assembled with a three-piece nozzle located in an injection molding device.

FIG. 13 is an exemplary vertical sectional view of the nozzle insert of FIG. 12 shown assembled with a three-piece nozzle located in an injection molding device. As shown in FIG. 13, the inner insert has a central hole from which a number of angled holes extend to channels (each channel can be connected to the central hole by one angled hole). The fins are tapering off to sharp edges towards the front of the tip, as shown in FIG. 12. The design shown in FIGS. 12-13 has six fins, although this embodiment is not limited to this number of fins.

The novel nozzle inserts in accordance with the embodiments of the present invention may be used with either a two-piece nozzle tip, having a combination inner insert—outer insert, or a three-piece nozzle tip, having a combination inner insert —outer insert—sealing surrounding piece/ring. Other aspects of the two-piece nozzle tips and three-piece nozzle tips are disclosed in copending patent applications assigned to assignee herein, including: U.S. patent application Ser. No. 10/934,544 filed Sept. 3, 2004; U.S. patent application Ser. No. 11/286,266 having an effective filing date of Nov. 22, 2004, and U.S. patent application Ser. No. 11/319,757 having an effective filing date of Dec. 30, 2004; the disclosures of which are herein incorporated by reference in their entirety for all purpose not inconsistent with the present description.

For example, the finned inner inserts described above can be used interchangeably with those of two-piece and three-piece nozzle tip designs as shown in: FIG. 1—Detail A (two-piece tip) and FIG. 15—Detail G (three-piece tip) of U.S. patent application Ser. No. 10/934,544; FIGS. 1 through 1G (three-piece tip), FIG. 5 through 5F (three-piece tip) and FIGS. 6 and 7 (two-piece tips) of U.S. patent application Ser. No. 11/286,266, and FIGS. 1 through 1F (two-piece tip) and FIGS. 4 through 4C (three-piece tip) of U.S. patent application Ser. No. 11/319,757.

All publications and descriptions mentioned above are herein incorporated by reference in their entirety for all purposes. None is admitted to be prior art.

The above description is illustrative and is not restrictive, and as it will become apparent to those skilled in the art upon review of the disclosure, the present invention may be embodied in other specific forms without departing from the essential characteristics thereof. These other embodiments are intended to be included within the scope of the present invention. The scope of the invention should, therefore, be determined not with reference to the above description, but instead should be determined with reference to the following and pending claims along with their full scope or equivalents.

What is claimed is:

1. An injection molding nozzle, comprising:
   an outer insert; and
   an inner insert configured to engage the outer insert, the inner insert configured for being centered within the outer insert, wherein centering between the inner insert and outer insert occurs along a cylindrical surface of contact between them,
   wherein on the inside the inner insert has a central duct for the delivery of molten plastic, and
   wherein on the outside the inner insert has a portion having a shape designed for torquing, followed by an engaging portion for engaging said outer insert, followed by a cylindrical portion for centering the inner insert with respect to the outer insert, followed by a finned portion having a first plurality of fins circumferentially disposed around the outside of the inner insert, said first plurality of fins forming a first plurality of flow channels between two adjacent fins, said first plurality of flow channels being in fluid communication with said central duct,
   on the outside said inner insert is further followed by a non-finned portion, and
   further followed by a second finned portion having a second plurality of fins circumferentially disposed around the outside of the inner insert, said second plurality of fins forming a second plurality of flow channels between two adjacent fins, said second plurality of flow channels being in fluid communication with said first plurality of flow channels, and
   followed by a reduced cylindrical portion that tapers off into a conical end of the inner insert.

2. The injection molding nozzle of claim 1 wherein said engaging portion comprises a threaded portion for threadably engaging said outer insert.

3. The injection molding nozzle of claim 1 wherein said engaging portion comprises a non-threaded portion for non-threaded engagement with said outer insert.

4. The injection molding nozzle of claim 3 wherein said non-threaded engagement comprises a slide-fit engagement.

5. The injection molding nozzle of claim 1 wherein said first and said second plurality of fins have a length along said first and said second plurality of flow channels, said length being non-parallel with respect to the length of the nozzle.

6. The injection molding nozzle of claim 1 wherein said first plurality of flow channels comprises three or more flow channels.

7. The injection molding nozzle of claim 1 wherein said second plurality of flow channels comprises three or more flow channels.

8. The injection molding nozzle of claim 1 wherein said second plurality of flow channels are circumferentially offset with respect to said first plurality of flow channels.

9. The injection molding nozzle of claim 1 wherein said inner insert on its inside comprises a plurality of flow passages that are inclined with respect to a longitudinal centerline of the inner insert, said plurality of flow passages being in fluid communication between the central duct and said first plurality of flow channels.

10. The injection molding nozzle of claim 9 wherein the number of flow passages that are inclined with respect to a longitudinal centerline of the inner insert is equal to the number of flow channels in said first plurality of flow channels.

11. The injection molding nozzle of claim 1 wherein the number of fins in said first plurality of fins is different from the number of fins in said second plurality of fins.

12. The injection molding nozzle of claim 1 wherein said first plurality of fins are tapered along a portion of the length of said first plurality of flow channels so as to provide an expanding outlet portion for each of said first plurality of flow channels.

13. The injection molding nozzle of claim 1 wherein said second plurality of fins are tapered along a portion of the length of said second plurality of flow channels so as to provide a contracting inlet portion followed by an expanding outlet portion for each of said second plurality of flow channels.

14. An injection molding nozzle, comprising:
an outer insert; and
an inner insert configured to engage the outer insert, the inner insert configured for being centered within the outer insert, wherein centering between the inner insert and outer insert occurs along a cylindrical surface of contact between them,
wherein on the inside the inner insert has a central duct for the delivery of molten plastic, and
wherein on the outside the inner insert has a portion having a shape designed for torquing, followed by an engaging portion for engaging said outer insert, followed by a cylindrical portion for centering the inner insert with respect to the outer insert, followed by a finned portion having a plurality of fins circumferentially disposed around the outside of the inner insert, said plurality of fins forming a plurality of flow channels between two adjacent fins, said plurality of flow channels being in fluid communication with said central duct,
on the outside said inner insert is further followed by a non-finned portion, and
followed by a reduced cylindrical portion that tapers off into a conical end of the inner insert.

15. The injection molding nozzle of claim 14 wherein said engaging portion comprises a threaded portion for threadably engaging said outer insert.

16. The injection molding nozzle of claim 14 wherein said engaging portion comprises a non-threaded portion for non-threaded engagement with said outer insert.

17. The injection molding nozzle of claim 16 wherein said non-threaded engagement comprises a slide-fit engagement.

18. The injection molding nozzle of claim 14 wherein said plurality of fins have a length along said plurality of flow channels, said length being non-parallel with respect to the length of the nozzle.

19. The injection molding nozzle of claim 14 wherein said plurality of flow channels comprises three or more flow channels.

20. The injection molding nozzle of claim 14 wherein said inner insert on its inside comprises a plurality of flow passages that are inclined with respect to a longitudinal centerline of the inner insert, said plurality of flow passages being in fluid communication between the central duct and said plurality of flow channels.

21. The injection molding nozzle of claim 14 wherein said plurality of fins are tapered along a portion of the length of said plurality of flow channels so as to provide an expanding outlet portion for each of said plurality of flow channels.

22. The injection molding nozzle of claim 14 wherein said finned portion is a first set of one or more finned portions, each of said one or more finned portions being disposed along a portion of the length of the outside of said inner insert and offset from the neighboring finned portions by a non-finned portion.

23. The injection molding nozzle of claim 22 wherein said one or more finned portions comprises two or more finned portions.

* * * * *